Figure 1:
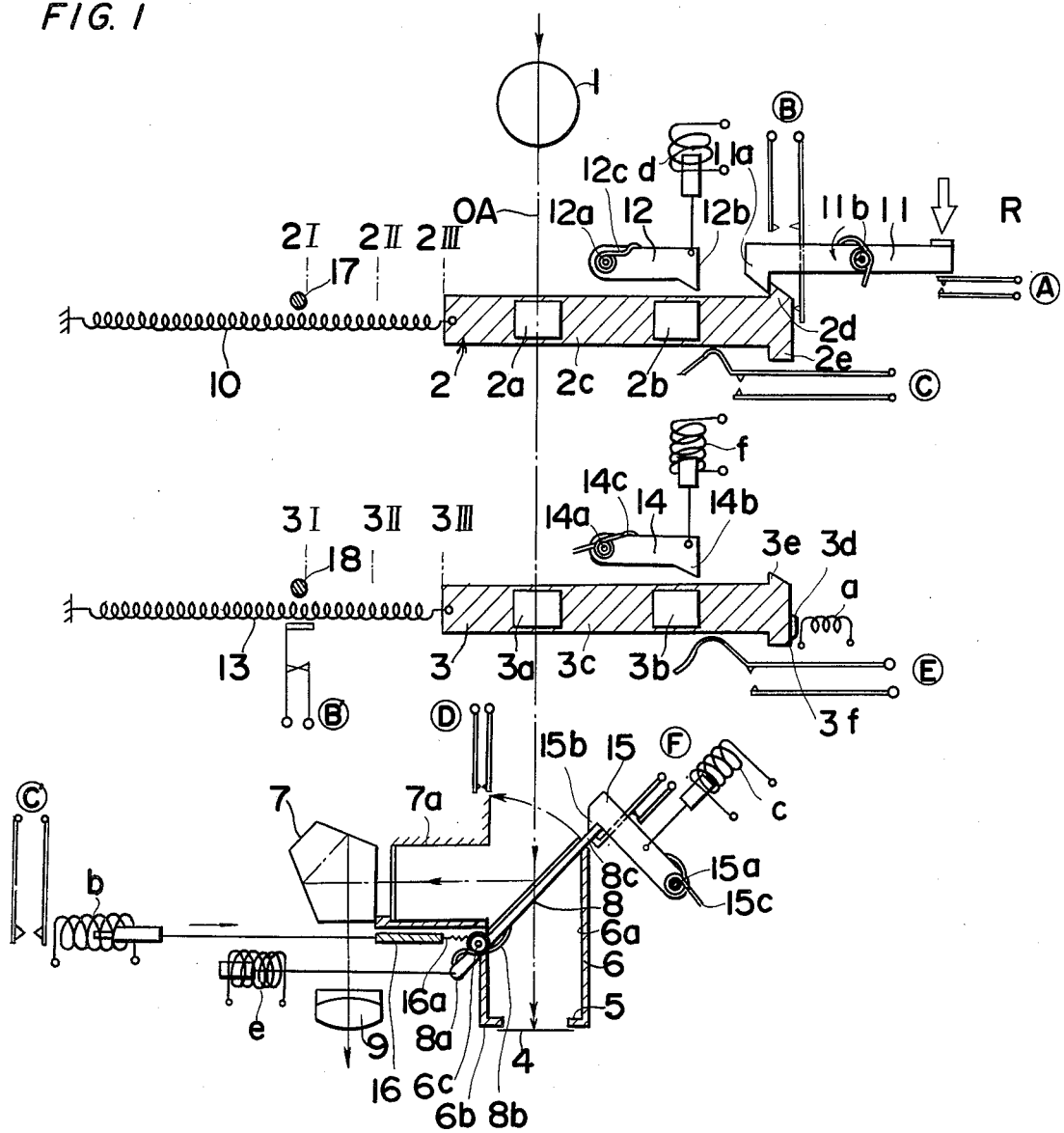

United States Patent [19]
Takahama

[11] 3,913,112
[45] Oct. 14, 1975

[54] SHUTTER AND VIEWFINDER MIRROR INTER-LINKAGE MEANS FOR A SMALL SINGLE-LENS REFLEX CAMERA

[75] Inventor: Sho Takahama, Nishinomiya, Japan
[73] Assignee: Fuji Photo Film Co., Ltd., Minami-ashigara, Japan
[22] Filed: Aug. 28, 1974
[21] Appl. No.: 501,390

[30] Foreign Application Priority Data
Aug. 28, 1973 Japan.............................. 48-96939

[52] U.S. Cl. ................. 354/156; 354/246; 354/248
[51] Int. Cl.² .. G03B 19/12; G03B 9/40; G03B 9/38
[58] Field of Search .......... 354/156, 242, 246, 248, 354/236, 50

[56] References Cited
UNITED STATES PATENTS

| | | | |
|---|---|---|---|
| 3,545,360 | 12/1970 | Guenther et al................ | 354/242 X |
| 3,691,917 | 9/1972 | Uchida et al. ................... | 354/50 X |
| 3,731,602 | 5/1973 | Umemura............................ | 354/50 |
| 3,766,839 | 10/1973 | Furusawa et al................ | 354/242 X |
| 3,829,877 | 8/1974 | Kitai ............................... | 354/242 X |

Primary Examiner—Richard A. Wintercorn
Attorney, Agent, or Firm—Sughrue, Rothwell, Mion, Zinn, & Macpeak

[57] ABSTRACT

A small single-lens reflex camera shutter and viewfinder mirror inter-linkage means providing electronically controlled synchronization of shutter and viewfinder mirror action. After being released from a cocked position, a 1st curtain in a guillotine shutter assembly is moved to and temporarily halted at an intermediate position in which it actuates a means causing the viewfinder mirror to move to a position for permitting film exposure and simultaneously causing the 1st curtain to be released from the intermediate position. The first curtain thereupon moves to a position allowing film exposure to start, and after a time determined by an electronically controlled means, the second curtain is released from the cocked position, and moved to and temporarily halted at an intermediate position wherein it terminates film exposure and actuates a means causing the viewfinder mirror to be returned to a normal position for reflecting light into a viewfinder and to simultaneously actuate a means causing release of the second curtain from the intermediate position, whereupon the second mirror moves to a position permitting light to reach the viewfinder mirror.

9 Claims, 10 Drawing Figures

SHUTTER AND VIEWFINDER MIRROR INTER-LINKAGE MEANS FOR A SMALL SINGLE-LENS REFLEX CAMERA

The present invention relates to a small single-lens reflex camera, and more particulalry to a shutter and viewfinder mirror inter-linkage means for employment therein.

There is known a type of camera termed a single-lens reflex camera wherein one and the same lens directs light into the camera to expose film, or onto a mirror which is positioned between the lens and a film to be exposed, and directs the light into the camera viewfinder, this mirror being swung out of the way to permit film exposure when the camera shutter release means is actuated, and subsequently being returned to its initial position for directing light into the viewfinder.

This type of camera commonly employs what is known as a guillotine shutter, which is constituted by two curtains having formed therein openings, whereby, in accordance with the relative positions of the two curtains, the shutter may pass or block light directed through the camera lens. It is known to provide electronic control means for a guillotine shutter, according to which after both the curtains have been moved to cocked positions, when the shutter release means is actuated, a first curtain is immediately released, and moves to a position to permit exposure, while the other, second curtain is retained in its cocked position by a electromagnetic means for a time which is determined in accordance with light received by a light sensor mounted on or near the camera, i.e., in accordance with ambient light conditions, after which time the second curtain is released and moves passing through the exposition, to a position wherein light is prevented from reaching the film, i.e., exposure is terminated. However, there is not known an electronic means for control of movement of the viewfinder mirror, in conjunction with shutter action, to positions for directing light into the viewfinder or for permitting exposure of film, which imposes a certain restriction on the extent to which single-lens reflex camera construction may be made compact, and prevents miniaturization of single-lens reflex cameras.

It is accordingly a main object of the present invention to provide a means for connecting a camera shutter and viewfinder mirror.

It is a further object of the invention to provide a single-lens reflex camera shutter and viewfinder mirror inter-linkage means which comprises a simple electronic circuit controllng movement of the viewfinder mirror in conjunction with shutter action.

In accomplishing these and other objects, there is provided according to the present invention a shutter and viewfinder mirror inter-linkage means wherein first and second curtains constituting a guillotine shutter, when moved to a cocked position, permit light reflected from and object to be photographed, and transmitted through the camera lens, to be directed onto a viewfinder mirror, which reflects the light, via a suitable optical path, into a viewfinder, and simultaneously prevents the light from reaching film loaded in the camera, the viewfinder mirror being normally retained in this position by an electronically controlled catch means, but being loaded by spring or similar means which urge the mirror to take up a position to permit film exposure and prevent light passing to the viewfinder. When the camera shutter release means is actuated, the second curtain is retained in a cocked position by an electromagnetic means controlled by a shutter speed control circuit, and the first curtain moves to and is temporarily halted at an intermediate position wherein it does not yet permit light reflected from the oboject to be photographed to rach the film, and wherein it closes a contact causing the viewfinder mirror catch means to disengage the viewfinder mirror, which thereupon moves into a position to permit film exposure and to prevent entry of light into the viewfinder, and simultaneously actuates a means causing the first curtain to be released from the intermediate position, whereupon the first curtain is moved to a position permitting passage of light transmitted through the camera lens, and, since the viewfinder mirror no longer blocks the path of this light, exposure commences, at the same time the viewfinder mirror catch means being returned to its initial position ready for engagement of the viewfinder mirror. After a time determined by the shutter speed control circuit in response to ambient light, the second curtain is released and is moved into engagement with an electronically controlled means which retains the second curtain in an intermediate position wherein the second curtain blocks light directed through the camera lens, thereby terminating film exposure, and simultaneously actuates a means for forcibly moving the viewfinder mirror back to its initial position for reflecting light into the viewfinder, and prevent-passage of light to the film plane. When moved back to this initial position, the viewfinder mirror actuates a means causing the second mirror retention means to release the second curtain from the intermediate position, whereupon the second curtain is moved to a position wherein, together with the first curtain, it again permits light passing through the camera lens to reach the viewfinder mirror.

According to the invention there may also be provided a small cover controlled by electromagnetic means, which, simultaneously with movement of the first curtain from a cocked position, are actuated to move the cover into a position to block light entering the camera viewfinder from the exterior and hold the cover in this position until the second curtain reaches a repose position and an exposure is terminated.

Figure 2:
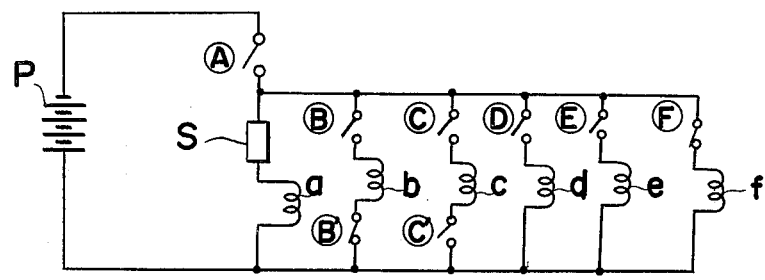

A better understanding of the present invention may be had from the following full description of one preferred embodiment thereof when read with reference to the attached drawings in which, FIG. 1 is a schematic lay-out view showing main parts of a shutter and viewfinder mirror inter-linkage means according to one embodiment of the invention;

FIG. 2 is a circuit diagram of a control circuit employed in the means of FIG. 1; and FIG. 3 through 10 are explanatory drawings in illustration of operation of the means of FIG. 1 during one exposure.

Referring initially to FIG. 1, there are shown schematically elements provided an a small-scale single-lens reflex camera and comprising a lens 1, a first curtain 2, a second curtain 3, and a viewfinder mirror 8, which are accomodated in a camera body (not shown) in a known manner, the first curtain 2 and second curtain 3 together constituting a guillotine-type shutter which is located between the lens 1 and viewfinder mirror 8. The 1st curtain 2 comprises two spaced openings 2a and 2b, which are disposed in line with one another along the longitudinal axis of the first curtain 2, and are separated by an opaque central portion 2c, and the second curtain 3 comprises two similarly disposed openings 3a and 3b separated by an opaque central portion 3c. The first curtain 2 and second curtain 3 are slidable independently of one another along a line normal to the optical axis OA of the lens 1, and depending on the settings thereof described below, may pass through openings, or may block light directed from the exterior of the camera to the interior thereof via the lens 1. Successive frames of a film 4 to be exposed are brought in a known manner into line with an exposure opening 5 which lies in line with the lens optical axis OA, and is formed at the rear end of an exposure light sleeve 6, which has a long side 6a and a short side 6b, and is constituted by suitable internal walls in a rear portion of the camera, and has a longitudinal axis coinciding with the lens optical axis OA. The viewfinder mirror 8 is provided at the front end of the sleeve 6.

To describe first the function of the viewfinder mirror 8, in its normall position the mirror 8 lies across the front end of the exposure light sleeve 6, at an inclination of 45° to the sleeve 6 longitudinal aixs and lens optical axis OA, and prevents any entry of light into the sleeve 6, regardless of the settings of the first curtain 2 and second curtain 3. In this normal position of the viewfinder mirror 8, any light that is permitted to reach the front end of the sleeve 6 is subjected to right-angled reflection by the mirror 8 and directed along a viewfinder light sleeve 7a, which is constituted by suitable internal wall portions of the camera, and whose longitudinal aixs is normal to that of the exposure light sleeve 6 and to the lens optical axis OA. Light passing along the viewfinder light sleeve 7a enters a penta prism 7, by which it is reflected through 90° and directed through a lens doublet constituting a eyelens 9 of the camera viewfinder, whereby, ,supposing the first curtain 2 and second curtain 3 are positioned to pass light directed into the camera by the lens 1, and that the viewfinder mirror 8 is in its normal position, a photographer may view an object to be photographed via the camera viewfinder. To permit exposure of the film 4, i.e., to permit light to pass along the lens optical axis OA into the exposure light sleeve 6, the viewfinder mirror 8 may be moved anticlockwise from its normal position and into an alignment parallel to the lens optical axis OA along the long side 6a, in which alignment the mirror 8 seals the inner end of the viewfinder light sleeve 7a. Mounting and control of actuation of the viewfinder mirror 8 is described below in reference to FIGS. 1 and 2.

The viewfinder mirror 8 is pivotally mounted about a shaft 6c, which extends parallel and near to the rear edge 8a of the mirror 8, and is fixedly mounted along the front edge of the short side 6b of the exposure light L sleeve 6. Mounted around the shaft 6c there is a wire spring 8b which exerts a constant force to swing the mirror 8 anticlockwise into an alignment parallel to the lens optical axis OA, and to a position to seal the viewfinder light sleeve 7a, in which position the front end of the mirror 8a presses and closes a normally-open contact D, which is in series with a solenoid and plunger assembly d for control of a first curtain intermediate stop lever 12, as shown with FIG. 2. One end of a compression spring 16a is fixedly attached to a point on the fixed shaft 6c, or to another suitable fixed point on or near the forward end of the outer side of the exposure light sleeve short side 6b. The other end of the spring 16a is fixedly attached to one edge of a small cover 16, whose opposite edge connects through suitable means to the plunger of a solenoid and plunger assembly b, and which is slidable along a line normal to the lens optical axis OA, and moveable to a position intermeidate between the penta prism 7 and the viewfinder eyelene 9, in which position the small cover 16 seals the interior of the camera to light passing through the eyelens 9. The solenoid and plunger assembly b is in series with a normally-open contact B and a normally-closed contact B', described below, and is normally unactuated, the spring 16a thus being unopposed to draw the cover 16 into a position out of line with the prism 7 and eyelens 9. When both the contacts B and B' are closed, the solenoid and plunger assembly b is actuated and the plunger thereof draws the cover 16 to between the prism 7 and eyelens 9, and at the same time closes a normally-open contact C', which is in series with a solenoid and plunger assembly c and a normally open contact C, described below.

The rear edge 8a of the mirror 8 connects, via a wire or other suitable means, to the plunger of a solenoid and plunger assembly e, which, when actuated upon closure of a normally open contact E described below, may swing the mirror 8 clockwise, counter to the force of the wire spring 8b, into its normal position inclined at 45° to the lens optical axis OA and sealing the exposure light sleeve 6. The mirror 8 may be retained in this normal position by a catch lever 15, which is constituted by a straight lever having one end pivotally mounted on a fixed pin 15a, and an opposite end forming a hook 15b for engagement of the front edge 8c of the mirror 8, the catch lever 15 being loaded by a spring 15c, which exerts a constant force urging the catch lever 15 anticlockwise into a position to engage the mirror 8. In the normal position of the mirror 8, the front edge 8c thereof projects slightly beyond the exposure light sleeve 6 and presses and closes a normally open contact F, which closes a power circuit to a solenoid and plunger assembly f for control of a second curtain intermediate stop lever 14 described below. The abovementioned soleonid and plunger assembly c in series with the normally-open contacts C and C' connects to the mirror catch lever 15, and when actuated draws the catch lever 15 clockwise, counter to the force of the spring 15a, and out of engagement with the mirror 8.

Still referring to FIGS. 1 and 2, the first curtain 2 and second curtain 3 each have three setting positions. For the first curtain 2 these positions are a leftmost position 2I, wherein the curtain opening 2b is in line with the lens optical axis OA, an intermediate position 2II, wherein the first curtain centre portion 2c is in line with the lens optical axis OA, and a rightmost position 2III, wherein the opening 2a thereof is in line with the lens optical axis OA. The second curtain 3 similarly has three setting positions 3I, 3II, and 3III, wherein the second curtain opening 3b, central portion 3c, and opening 3a, respectively are brought into line with the lens optical axis OA.

The left-hand end of the first curtain 2 is in attachment to one end of a compression spring 10, whose other end is attached to a fixed portion of the camera, and which exerts a constant force to draw the first curtain 2 leftwards, into contact with a stop stud 17, which holds the first curtain 2 in position 2I. Upon actuation by a photographer of a suitable cocking means not shown in a known manner, the first curtain 2 and second curtain 3 are moved to their respective rightmost positions 2III and 3III, the second curtain 3 being retained in this position by the first curtain 2 acting through a suitable known connecting means not indicated in the drawing. The first curtain 2 is retained in the rightmost, cocked position 2III by a cocking retainer 11 having a hooked lefthand end portion 11a which engages a corresponding hook portion 2d formed at the right-hand end of the first curtain 2. The cocking retainer 11 is pivotally mounted about a fixed pin 11b passing through a generally central portion thereof, and has mounted thereon a wire spring 11c, which exerts a constant force urging the retainer 11 into an alignment for engagement of the first curtain 2. The cocking retainer 11 may be moved out of engagement with the first curtain 2 by pressure applied to the right-hand end thereof by a suitable means such as lever not shown which is actuated upon depression of the camera shutter button, also not shown, at which time the right-hand end of the retainer 11 presses and closes a normally open contact A, thereby closing the power supply circuit to the electronic control circuit according to the invention of FIG. 2. When released from engagement by the cocking retainer 11, the first curtain 2 is drawn leftwards by the spring 10, until the hooked end portion 2d thereof comes into engagement with the abovementioned intermediate stop lever 12, which holds the first curtain 2 in the intermediate position 2II wherein the opaque central portion 2c thereof is in line with the lens optical axis OA. The intermediate stop lever 12 is constituted by a lever which has one end pivotally mounted on a fixed pin 12a, and an opposite end forming a hook portion 12b for engagement of the first curtain right-hand end hook portion 2d, and on which is mounted a wire spring 12c, which exerts a constant force to move the stop lever 12 clockwise and into an alignment for engagement of the 1st curtain 2. The intermediate stop lever 12 is conected to the abovementioned solenoid and plunger assembly d, which, when actuated by closure of the normally-closed contact D by the mirror 8 moving to open the exposure light sleeve 6, draws the stop lever 12 anticlockwise, against the force of the spring 12c, and out of engagement with the 1st curtain 2, which is thereupon drawn leftwards by the spring 10, into contact with the stop stud 17, i.e., to position 2I. As soon as the first curtain 2 starts moving from the rightmost position 2III it closes the normally-open contact B which is in series with the normally-closed contact B' and the solenoid and plunger assembly b connecting to the cover 16 and able to close the normally-open contact C'. Also, when the first curtain 2 is at the intermediate position 2II, a projecting portion 2e thereof contacts and closes the abovementioned normally-open contact C which is in series with the contact C' and the solenoid and plunger assembly c connecting to the mirror catch lever 15. For other positions of the second curtain 2, the contact C is open.

The second curtain 3 is in attachment to one end of a compression spring 13, whose other end is attached to a fixed portion of the camera, and which exerts a constant force to draw the second curtain 3 up against a stop stud 18 and into a leftmost position 3I. As noted earlier, the second curtain 3 is moved into a rightmost cocked position 3III together with the first curtain 2, and prior to actuation of the camera shutter button is held in the position 3III by the first curtain 2. Upon depression of the camera shutter button causing release of the first curtain 2 and simultaneous closure of the contact A, the second curtain 3 remains held in the position 3III by an electromagnetic means a which is in series with a shutter speed control circuit S, to which power is supplied upon closure of the contact A.

The second curtain 3 has a projection of ferrous metal 3d at its right end which is attracted with the electromagnetic means a energized upon closure of the contact A. The speed control circuit is a conventionally known means for control of shutter opening time, and includes or connects to a light sensor, for example, effects continuation of power supply to the circuit of FIG. 2, and maintains energization of the electromagnetic means a, and hence retention of the second curtain 3 in the position 3III, for varying times in accordance with ambient light conditions. When the electromagnetic means a is de-energized, the second curtain 3 is drawn leftwards by the spring 13 until a projecting portion 3e thereof comes into engagement with the abovementioned intermediate stop lever 14, which holds the second curtain 3 in position 3III. When the second curtain 3 is in the position 3II, another projecting portion 3f thereof presses and closes the abovementioned normally-open contact E which is in series with the solenoid and plunger assembly e connecting to the rear end 8a of the viewfinder mirror 8. For all other positions of the second curtain 3 the contact E is unactuated and remains open. Like the stop lever 12, the stop lever 14 is constituted by a lever which has one end pivotally mounted on a fixed pin 14a, and the other end 14b forming a projection portion for engagement of the second curtain 3, and is constantly urged by a spring 14c mounted thereon into a position for engagement of the second curtain 3. The stop lever 14 connects to the abovementioned solenoid and plunger assembly f which is controlled by the normally-open contact F closeable by the mirror 8, and which, when energized, pulls the stop lever 14 out of engagement with the second curtain 3, which is thereupon drawn leftwards by the spring 13 to position 3I, in contact with the stop stud 18. When the second curtain 3 reaches position 3I, the left-hand end thereof presses and opens the normally-closed contact B' in series with the solenoid and plunger assembly b connecting to the cover 16 and the normally open contact B.

Referring more particularly to FIG. 2, in the electrical circuit of the means of the invention the normally-open contact A is in series with a power source P and a parallel bank including a branch having the speed control circuit S and electromagnetic means a in series, a branch having the normally open contact B, solenoid and plunger assembly b, and normally close contact B' is series, a branch having the normally open contact C, solenoid and plunger assembly c and normally open contact C' in series, a branch having the normally open contact D in series with the solenoid and plunger assembly d, a branch having the normally open contact E in series with the solenoid and plunger assembly e, and a branch having the normally open contact F in series with the solenoid and plunger assembly f, it being noted that the normally open contact F is unactuated and therefore open only during exposure of a frame of the film 4.

Figure 3:
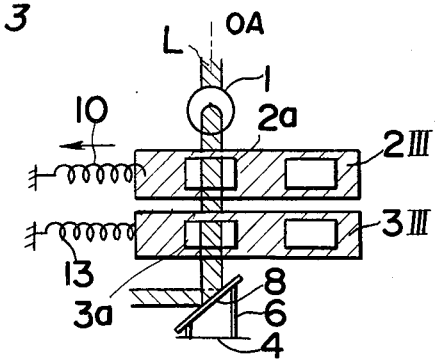

With reference now to FIG. 1 and to FIGS. 3 through 10, the sequence in taking one photograph with the abovedescribed means is as follows. First, a cocking means not shown is actuated to move the first curtain 2 and second curtain 3 to their respective rightmost positions 2III and 3III (FIG. 3). Light L passes through the first curtain opening 2a and the second curtain opening 3a and reaches the viewfinder mirror 8, which at this time is in its normal position across the front end of the exposure light sleeve 6, at 45° to the lens optical axis OA, and directs the light into the camera viewfinder, via the penta prism 7 and eyelens 9. At this time the only circuit element actuated is contact F, which, however, has no effect, since contact A providing connection to the power supply is open.

Figure 4:
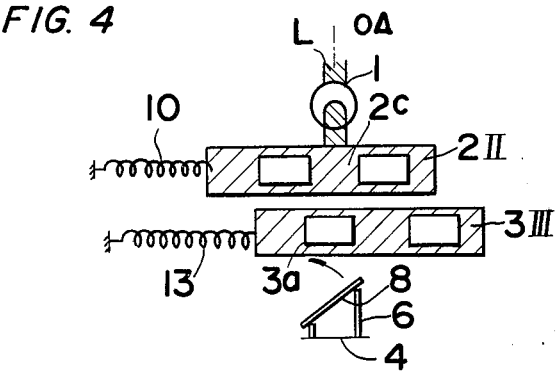

In FIG. 4, when the camera shutter button is actuated, the cocking retainer 11 closes contact A and releases the first curtain 2. Closure of contact A closes the power supply circuit, and the speed control circuit S energizes the electromagnetic means a to retain the second curtain 3 in the cocked position 3III, while receiving input from a light sensor or similar means that determines the length of time the electromagnetic means a is to be kept energized. Being released, the first curtain 2 travels from position 2III to position 2II, and simultaneously closes the contact B. Contact B being closed by the first curtain 2, and contact B' being normally closed and being unactuated at this stage, the solenoid and plunger assembly b in series therewith is actuated and draws the cover 16 to between the penta prism 7 and eyelens 9, to ensure prevention of entry of light into the camera via the viewfinder, and simultaneously closes contact C'. When the first curtain 2 reaches the intermediate position 2II, the opaque central portion 2c thereof comes into line with the lens optical axis OA, and at the same time the first curtain 2 closes the contact C. Both contacts C and C' being closed, the solenoid and plunger assembly c is energized and draws the viewfinder mirror catch lever 15 anticlockwise, against the force of the spring 15a, and out of engagement with the viewfinder mirror 8.

Figure 5:
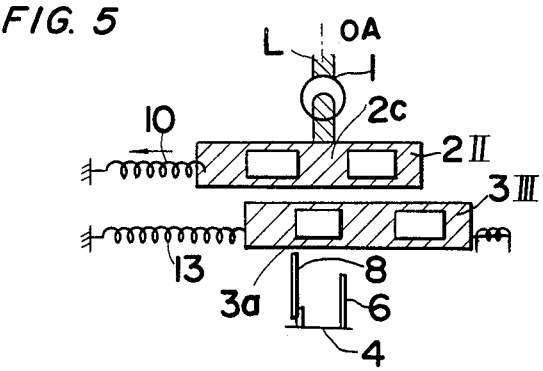

In FIG. 5, being disengaged by the catch lever 15, the viewfinder mirror 8 is swung anticlockwise by the spring 8b, permits the contact F to open, and moves to a position in which it opens the exposure light sleeve 6 and seals the viewfinder light sleeve 7a, while simultaneously closing the contact D.

Figure 6:
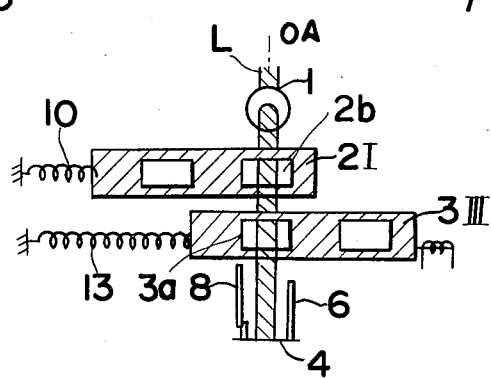

In FIG. 6, the contact D being closed, the solenoid and plunger assembly d is energized and draws the 1st curtain intermediate stop lever 12 out of engagement with the first curtain 2, which is thereupon drawn by the spring 10 to position 2I. Upon leaving the intermediate position 2II the first curtain 2 permits the contact C to open. The solenoid and plunger assembly c is therefore de-energized and permits the spring 15a to return the viewfinder mirror catch lever 15 to its normal position, in readiness for engaging the mirror 8. When the first curtain 2 reaches its leftmost position 2I, the opening 2b thereof comes into line with the lens optical axis OA, and light entering the lens 1 may pass through the first curtain opening 2b and second curtain opening 3a, enter the exposure light sleeve 6, which is now opened by the mirror 8, and expose film 4 in the exposure opening 5 formed at the rear end of the sleeve 6. After a lapse of time which is longer or shorter according to whether the photographed scene or object is darker or lighter, the speed control circuit S de-energizes the electromagnetic means a.

Figure 7:
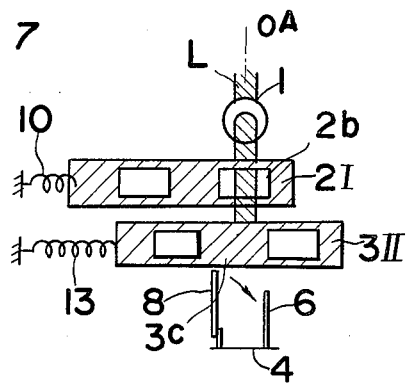

In FIG. 7, electromagnetic means a being de-energized, the second curtain 3 is no longer retained, and is drawn leftwards by the spring 13 until it comes into engagement with the stop lever 14, which is not currently acted upon by the solenoid and plunger assembly f since the contact F has been permitted to open by the mirror 8 moving out of contact therewith, and which holds the second curtain 3 in the intermediate position 3II. In this position of the second curtain 3, the opaque central portion 3c thereof comes into line with the lens optical axis OA, whereby exposure of the film 4 is terminated. At the same time the second curtain 3 closes the contact E.

Figure 8:
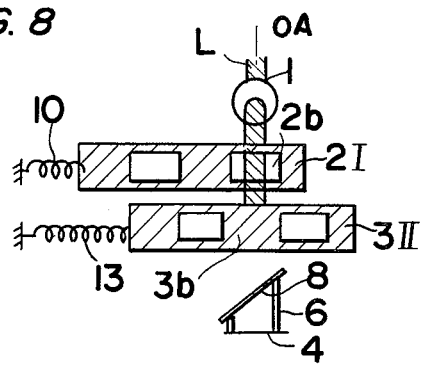

In FIG. 8, the contact E being closed, the solenoid and plunger assembly e is energized and swivels the viewfinder mirror 8 clockwise, counter to the force of the spring 8b, and brings the mirror 8 into its normal position across the front end of the exposure light sleeve 6 and at 45° to the lens optical axis OA, the catch lever 15 being pivoted clockwise slightly and then moving back to engage the mirror 8, as the mirror 8 comes to this normal position. At the start of this movement the mirror 8 disengages the contact D, which therefore opens, and once returned to its normal position, the mirror 8 again closes the contact F. When the contact D opens, the solenoid and plunger assembly d is de-energized and allows the spring 12a to return the first curtain intermediate stop lever 12 to a position for engagement of the first curtain 2, in readiness for the next photograph. Closure of the contact F results in energization of the solenoid and plunger assembly f, which therefore draws the intermediate stop lever 14 out of engagement with the second curtain 3.

Figure 9:
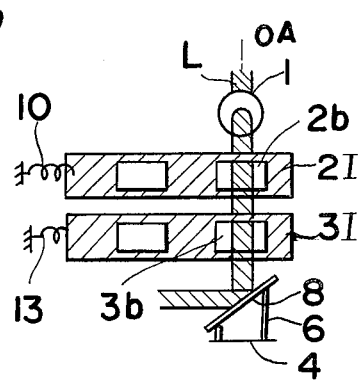

In FIG. 9, being disengaged from the stop lever 14, the second curtain 3 is drawn by the spring 13 from the intermediate position 3II to the repose position 3I, and simultaneously disengages and permits opening of the contact E. The contact E being open, the solenoid and plunger assembly e is de-energized, and therefore no longer acts on the viewfinder mirror 8, which, however, is now held by the catch lever 15. When the second curtain 3 reaches the repose position 3I, the left-hand end thereof opens the normally-closed contact B', and at the same time the opening 2b thereof is brought into line with the lens optical axis OA. Contact B' being opened, the solenoid and plunger assembly b is de-energized, and the spring 16a is unopposed to draw the cover 16 rightwards to its normal position out of line with the penta prism 7 and eyelens 9. Light entering the lens 1 may now pass through the first curtain opening 2b and second curtain opening 3b to impinge on the viewfinder mirror 8, which directs the light, via the prism 7 and eyelens 9, to the viewfinder, whereby a photographer may view objects which it may be desired to photograph.

Figure 10:
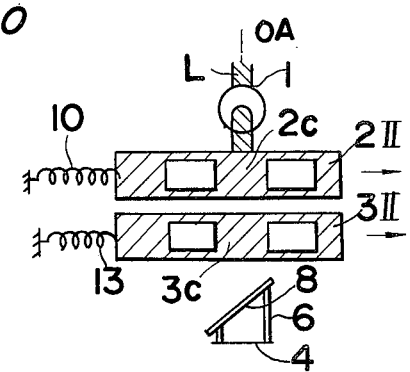

FIG. 10 illustrates the action when the shutter cocking means is actuated in preparation to taking another photograph.

The first curtain 2 and second curtain 3 are together moved rightwards from their respective leftmost positions 2I and 3I, the opaque central portions 2c and 3c of the first curtain 2 and second curtain 3, respectively, are momentarily brought into line with the lens optical axis OA, and then the first curtain 2 and second curtain 3 are brought to their respective cocked positions 2III and 3III, in which the first curtain opening 2a and the second curtain opening 3a are in line with the lens optical axis OA, the alignment being again that sown in FIG. 3, after which, to effect film exposure, the abovedescribed action is repeated.

As is clear from the above description, the present invention provides a single lens reflex camera shutter and viewfinder mirror inter-linkage means that effects smooth and accurate synchronization of shutter and viewfinder mirror action, and is of a simple, compact construction, whereby miniaturization of a camera is facilitated. Also, while requiring only a few constructional elements, the means of the invention, by the employment of identical elements in different portions thereof, lends itself to mass-production.

What is claimed is:

1. In a single-lens reflex camera having a lens system along whose optical axis light reflected from external objects may be directed into the interior of said camera to be directed into a viewfinder observable by a photographer or to expose a film, a guillotine-type shutter comprising a first curtain and a second curtain, each of which is independently moveable, is normally urged to and remains in a repose position, wherein it permits passage of light directed into said camera by said lens system, and is moveable to and retainable in a cocked position, wherein it permits passage of said light, electronically controlled means which is actuated simultaneously with release of said first curtain from said cocked position and subsequently holds said second curtain in said cocked position for a time that is variable in accordance with ambient light conditions, and a pivotally mounted mirror, which is moveable to first mirror position wherein said mirror permits light directed into said camera by said lens system and passed by said shutter to reach and expose a film, and to a second mirror position wherein said mirror prevents said light from reaching a film and directs said light into said viewfinder, a shutter and mirror interlinkage means comprising a first retention means which, subsequent to release of said first curtain from said cocked position, retains said first curtain in a first curtain intermediate position wherein said first curtain prevents passage of light directed into said camera by said lens system.

first mirror pivot means exerting a constant force urging said mirror to move to said first mirror position mirror retention means which may hold said mirror in said second mirror position, and is actuated to disengage said mirror by said first curtain at said first curtain intermediate position first disengagement means which may effect disengagement of said first retention means from said first curtain, whereby said first curtain may be moved from said first curtain intermediate position to said repose position, and permit commencement of a film exposure, and which is actuated by said mirror at said mirror first position second retention means which, subsequent to release of said second curtain from said cocked position, retains said second curtain in a second curtain intermediate position wherein said second curtain prevents passage of light directed into said camera by said lens system, whereby a film exposure is terminated second mirror pivot means which may move said mirror to said second mirror position, and is actuated by said second curtain at said second curtain intermediate position second disengagement means which may effect disengagement of said second retention means from said second curtain, whereby said second curtain may be moved from said second curtain intermediate position to said repose position, and which is actuated by said mirror at said second mirror position.

2. A shutter and mirror inter-linkage means as recited in claim 1, wherein said first retention means and said second retention means are constituted by pivotally mounted, spring-loaded hooked levers normally urged into alignment for engagment of the said first curtain and said second curtain respectively.

3. A shutter and mirror inter-linkage means as recited in claim 1, wherein said 1st disengagement means and said second disengagement means are each constituted by a solenoid and plunger assembly connectable to a power supply by a normally open contact in series therewith, said contacts associated with said first disengagement means and second disengagement means being closeable by said mirror at said first mirror position and said second mirror position respectively.

4. A shutter and mirror inter-linkage means as recited in claim 1, wherein said 1st mirror pivot means is a wire spring mounted about the pivotal axis of said mirror.

5. A shutter and mirror inter-linkage means as recited in claim 1, wherein said mirror retention means is constituted by a pivotally mounted, spring-loaded hooked lever normally urged into an alignment for engagement of said mirror, a solenoid and plunger assembly connecting to said lever and actuable to move said lever out of an alignment for engagement of said mirror, and a normally-open contact, which is in series with, and may close a power supply circuit for, said solenoid and plunger assembly, and is closed by said 1st curtain at said 1st curtain intermediate position.

6. A shutter and mirror inter-linkage means as recited in claim 1, wherein said second mirror pivot means is constituted by a solenoid and plunger assembly connecting to said mirror, actuable to move said mirror from said first mirror position to said second mirror position, counter to the force of said first mirror pivot means, and connectable to a power supply through a normally-open contact which is closed by said second curtain at said second curtain intermediate position.

7. A shutter and mirror inter-linkage means as recited in claim 1, which further comprises a cover moveable to a first position permitting passage of light between said camera viewfinder and the interior of said camera, and to a second position preventing passage of light between said camera viewfinder and said camera interior, means for moving said cover to said first position, and means for moving said cover to said second position.

8. A shutter and mirror inter-linkage means as recited in claim 7, wherein said means for moving said cover to said first position is constituted by a compression spring which is attached at one end to said cover and at the opposite end to a fixed camera portion.

9. A shutter and mirror inter-linkage means as recited in claim 7, wherein said means for moving said cover to said second position is constituted by a solenoid and plunger assembly connecting to said cover, and connectable to a power supply through a normally-open contact and a normally-closed contact in series therewith, said normally-open contact being closed by said first curtain at positions other than said cocked position thereof, and said normally-closed contact being opened by said second curtain at said repose position thereof.

* * * * *